US012462664B2

(12) United States Patent
Wang

(10) Patent No.: US 12,462,664 B2
(45) Date of Patent: Nov. 4, 2025

(54) SYSTEM FOR LOCATING AN ELECTRONIC ACCESSORY DEVICE

(71) Applicant: GN Hearing A/S, Ballerup (DK)

(72) Inventor: Fang Wang, Copenhagen (DK)

(73) Assignee: GN HEARING A/S, Ballerup (DK)

( * ) Notice: Subject to any disclaimer, the term of this patent is extended or adjusted under 35 U.S.C. 154(b) by 277 days.

(21) Appl. No.: 17/944,052

(22) Filed: Sep. 13, 2022

(65) Prior Publication Data

US 2023/0099728 A1 Mar. 30, 2023

(51) Int. Cl.
*G08B 21/24* (2006.01)
*H04R 25/00* (2006.01)

(52) U.S. Cl.
CPC ........... *G08B 21/24* (2013.01); *H04R 25/554* (2013.01)

(58) Field of Classification Search
CPC .. H04R 25/505; H04R 25/554; H04R 25/558; H04R 27/00; H04R 2460/07; H04R 2225/43; H04R 2225/41; G08B 21/24
See application file for complete search history.

(56) References Cited

U.S. PATENT DOCUMENTS

| | | | | |
|---|---|---|---|---|
| 2004/0209658 A1* | 10/2004 | Liu | G08B 21/24 | 455/70 |
| 2006/0116107 A1 | 6/2006 | Hulvey | | |
| 2009/0208043 A1* | 8/2009 | Woods | H04R 25/554 | 381/315 |
| 2014/0086417 A1* | 3/2014 | Hansen | H04R 25/00 | 381/23.1 |
| 2014/0105433 A1* | 4/2014 | Goorevich | H04R 25/43 | 381/312 |
| 2016/0057553 A1* | 2/2016 | Ryu | H04R 1/1041 | 340/4.41 |
| 2016/0373869 A1* | 12/2016 | Gran | H04R 25/558 | |
| 2018/0007477 A1* | 1/2018 | De Vries | H04R 25/558 | |
| 2018/0336901 A1* | 11/2018 | Masaki | G10L 15/26 | |

(Continued)

FOREIGN PATENT DOCUMENTS

| | | |
|---|---|---|
| CN | 111696578 | 9/2020 |
| WO | WO 2020/056236 | 3/2020 |

(Continued)

OTHER PUBLICATIONS

Extended European Search Report for EP Patent Appln. No. 21199886.9 dated Mar. 22, 2022.

*Primary Examiner* — Carolyn R Edwards
*Assistant Examiner* — Julie X Dang
(74) *Attorney, Agent, or Firm* — Vista IP Law Group, LLP

(57) ABSTRACT

The disclosure relates to a system for locating an electronic accessory device, the system comprising one or more electronic accessory devices and a hearing device. One or more electronic accessory devices comprise a first electronic accessory device. Each of the one or more electronic accessory devices being configured to provide a wireless connection with the hearing device. The hearing device, when wirelessly connected with the first electronic accessory device, is configured to send a first request to the first electronic accessory device, and wherein the first electronic accessory device is configured to generate a first notification upon reception of the first request. The disclosure further relates to a method for locating an electronic accessory device and a computer program.

28 Claims, 4 Drawing Sheets

(56) References Cited

U.S. PATENT DOCUMENTS

| | | | | |
|---|---|---|---|---|
| 2019/0082274 | A1 * | 3/2019 | Dickmann | H04R 25/453 |
| 2019/0373380 | A1 * | 12/2019 | Blendinger | H04R 25/505 |
| 2021/0185455 | A1 | 6/2021 | Goekay | |
| 2021/0376880 | A1 * | 12/2021 | Carrigan | H04L 67/125 |
| 2023/0325145 | A1 * | 10/2023 | Ni | G06F 21/32<br>700/94 |

FOREIGN PATENT DOCUMENTS

| | | | | |
|---|---|---|---|---|
| WO | WO 2021/142290 | | 7/2021 | |
| WO | WO-2021142290 | A2 * | 7/2021 | G01C 21/206 |

* cited by examiner a)

b)

SYSTEM FOR LOCATING AN ELECTRONIC ACCESSORY DEVICE

RELATED APPLICATION DATA

This application claims priority to, and the benefit of, European Patent Application No. EP 21199886.9 filed on Sep. 29, 2021. The entire disclosure of the above application is expressly incorporated by reference herein.

FIELD

The present disclosure relates to a system for locating an electronic accessory device, a method for locating the electronic accessory device and a corresponding computer program.

BACKGROUND ART

Accessories such as smartphones are continuously being developed and used by the majority of people throughout an entire day. Their use is constantly increasing. As a smartphone is a hand-held device, a user may easily lose it or simply forget where the smartphone is placed. In order to locate a misplaced accessory device outside of a user's view, the user may use a computer application which requires various usernames and passwords in order to activate the phone and show the user where the phone is, when the smartphone and computer application have GPS sensors. Thereafter, such application can instruct the phone to ring or vibrate and thereby alert the user of the phone's location. Therefore, there is a need for a simple and quick method for finding the misplaced phone. Also, there is a need for a system in which the user can send voice messages to the misplaced phone so that other people can assist the user in finding the phone.

SUMMARY

It is an object of the present disclosure to mitigate, alleviate or eliminate one or more of the above-identified deficiencies and disadvantages in the prior art and solve at least the above mentioned problem.

In particular, it is an object of the embodiments to help a user of a hearing device to locate an electronic accessory device wirelessly connected to the hearing device. For easy understanding, "first/second electronic accessory device" and "first/second accessory device" are interchangeable used through out the description.

Optionally, it is also an object of the embodiments to provide a system having a hearing device and an electronic accessory device wirelessly connected with one and other, and which can serve as an one-way walkie-talkie function allowing the user of the hearing device to send voice messages to the accessory device and ask for help from other people to assist him/her to find the accessory device.

It is a further object of the embodiments to provide a system comprising a hearing device and a plurality of electronic accessory devices connected to the hearing device wirelessly, the system assisting the user to locate any of the plurality of electronic accessory devices.

According to a first aspect there is provided a system for locating an electronic accessory device, the system comprising one or more electronic accessory devices and a hearing device, wherein the one or more electronic accessory devices comprise a first electronic accessory device, the first electronic accessory device and hearing device being configured to provide a wireless connection with each other, wherein the hearing device, when wirelessly connected with the first electronic accessory device, is configured to send a first request to the first electronic accessory device, and wherein the first electronic accessory device is configured to generate a first notification upon reception of the first request.

The system is therefore configured to physically locate the first electronic accessory device. Therefore, the purpose of the system is to assist a user of the first electronic accessory device to locate it in space. Optionally, the system may be used by one person, the user, owning both the accessory device and the hearing device. In general, in order to locate the accessory device, the user may be in a relatively close proximity of the misplaced accessory device while wearing or carrying the hearing device. Namely, the user may be in the close proximity to the accessory device to the extent which the wireless connection between the electronic accessory device and the hearing device is still maintained.

The one or more electronic accessory devices may include a personal digital assistant (PDA) comprising at least one built-in speaker. The electronic accessory devices may be a remote control, a spouse microphone, a TV streamer, a smartphone, a laptop, a tablet, a watch, single hearing device in a binaural hearing device system or similar. The hearing device(s) may be a hearing aid, a headset, a binaural hearing device system, a binaural hearing aid system, and/or the like. Typically, the hearing device is configured to be worn by the user and thereby most of the time within user's reach. On the other hand, the accessory device may be a hand-held device and the user may not always carry/wear it.

The first electronic accessory device and hearing device are configured to be wirelessly connected. Namely, the two devices can be connected with each other through a wireless connection. Therefore, both devices may comprise a wireless communication unit which enables mutual wireless connection. In one embodiment, the two devices may be connected to the same wireless network and communicate through that network. In another embodiment, the two devices may be paired. Namely, an initial linkage between the accessory device, e.g. a smartphone, and the hearing device, e.g. a headset, is established to allow communications between them. In one embodiment, the pairing is established via e.g. Bluetooth or wifi or NFC units of the two devices.

When the two devices are wirelessly connected, the hearing device can send a first request to the first electronic accessory device. Namely, the hearing device may send the first request to the accessory device requesting it to generate a first notification, e.g., play a sound. The first request may be an electronic signal, such as a ping signal. The request may comprise an audio signal which can be played back by the loudspeaker in the electronic accessory device. The request may optionally comprise a pre-recorded sound. The audio signal may optionally include the user's voice which may be generated by the user when the user initiates sending the request. The user's voice comprised in the audio signal may be picked up by the microphone in the hearing device. Alternatively, the sound played by the electronic accessory device may optionally be stored in the accessory device. The request may comprise a command to the accessory device to activate a mode in which a notification is generated at the accessory device to thereby assist the user to locate the accessory device. In general, the request is to be interpreted as a signal that triggers the next operation in the accessory device, i.e. generation of the notification. The time of sending the request may be scheduled by the user or may be generated upon user's request.

In response to the request, the electronic accessory device is configured to generate a notification. The notification is generated upon reception of the request. The notification may be in a form of an audible signal which can be received by the hearing device via at least one microphone thereof and/or identified and noticed by the user, to help the hearing device user to locate the accessory device. The notification may optionally be configured to have a certain duration, e.g. the smartphone may be beeping for a limited time, such as for 5 seconds, 10 seconds, 20 seconds, or longer. The duration of the notification may be set by the user. The duration of the notification may optionally be as long as needed for the user to locate the accessory device, or optionally deactivated by the user when successfully locating the accessory device. The notification may also be in the form of an audio signal wirelessly transmitted, i.e. streamed, from the accessory device to the hearing device via at least one wireless antenna thereof. Optionally, the streamed signal may be used in case the sound picked up from the accessory device is not clear enough for the user to hear it and/or to determine the direction which the sound comes from. Then, when user indicates (e.g. when the user tries to send the same request more than once within a short time e.g. within 1, 10, 30 seconds or within 1 minute) that the sound picked up by the hearing device is not clear enough, the hearing device may optionally apply a directionality processing, e.g. a head-related transfer function (HRTF) and/or beamforming, to the streamed audio sound. In this case, the output of the receiver in the hearing device may comprise the streamed audio signal from the accessory device.

Alternatively, the notification may be in the form of combination of the input from the microphones of the hearing device and the input from the wireless antenna of the hearing device, i.e. the mix of acoustic signal pick up by the microphones and the wirelessly streamed signal received from the antenna. These two inputs can be mixed in a way that, the spatial cues contained in the input from the microphones can be applied to the streamed signal thereby it is easier for the user to locate the accessory device.

Thus, the system with a hearing device and an accessory device connected to the hearing device is provided and configured such to assist the user of the system to locate the accessory device in cases when the accessory device cannot be located or seen by the user.

According to some embodiments, the hearing device is configured to send the first request to the first electronic accessory device on-demand initiated by the user. The hearing device may be configured to receive an input from the user and to send the request to the accessory device upon receiving the input. The hearing device may comprise a push button and the user can press the push button to thereby initiate sending the request. Alternatively, the user can tap the hearing device. The user can touch a touch sensor arranged on the hearing device. In yet one alternative, the user can provide a voice command. By initiating the request by the user the system is activated only at times when the user cannot find the accessory device and when the user wants to find it.

According to some embodiments, the first request comprises a user's voice. The user may for instance tap the hearing device and then provide a voice input such as: "where is my phone" or "this is Johnny, can anyone near my phone bring it to me". By having the request that comprises user's voice, the user may shape the request to reflect the user's needs. Alternatively, the user may pre-record an audio signal and initiates its generation by, e.g., pressing a touch sensor of the hearing device. The pre-recorded audio signal may be the user's voice in a form of a voice command.

According to some embodiments, the first request is configured to activate a loudspeaker of the first electronic accessory device and wherein the first notification comprises an audio signal. The audio signal may then be generated by the loudspeaker of the accessory device. The audio signal may last a predetermined time. The predetermined time may be set by the user. Alternatively, the audio signal may last until the user (or another person) finds the accessory device and deactivate the notification and/or turns off the loudspeaker. By having the notification comprising the audio signal, the user or another person can locate the accessory device in an easy manner by using his/her spatial hearing.

According to some embodiments, the first request may optionally comprise a user's input and wherein the first notification comprises a first notification code, the first notification code corresponding to the user's input. In some embodiments, the request may optionally comprise the user's input in the form of a voice command. In that case the first notification code may comprise the voice command or a predefined audio signal mapped to the voice command. The first notification then reflects the first notification code such that the first notification code comprises either the voice command or the predefined audio signal. The user may define mapping between the user's input and the notification code. For instance, if the user initiates the request by touching the touch sensor of the hearing device, the notification code may be a light signal. In that case, the notification may comprise a light signal and the accessory device may for instance start blinking, or a display of the accessory device may turn on, or a flash light may be activated, or similar. In another scenario, if the user initiates sending the request by tapping the hearing device, the notification code may be a haptic signal. In that case, the notification may comprise a haptic signal and the accessory device may start vibrating in response to the request. The accessory device may have a predefined mapping between requests and notification codes, or the user may define the mapping. By having a link between a request type and the notification, the user may have the notification depending on circumstances of the day. For instance, if the user is looking for the accessory device at night time, the notification may preferably comprise a visual signal, such as a flashlight. If the user is looking for the accessory device in a quiet room, the notification may preferably comprise only vibration signal.

The notification may comprise the request, and in particular when the request comprises the user's voice.

According to some embodiments, the hearing device is a hearing aid configured to be worn by the user and comprising at least one input transducer. The hearing aid is configured to at least partly compensate for a hearing loss of the user. The hearing aid may be configured to detect the first notification via the at least one input transducer and provide it to the user. The hearing aid may pick up the first notification signal generated by the accessory device and the user may find the accessory device based on the received notification signal. The hearing aid may at first generate the request and, upon generation of the request, adapt its operational mode to be in particular susceptible to the notification generated by the accessory device. It is advantageous to have a hearing aid configured to detect the notification and provide it to the user as such device can help a hearing impaired user to locate the accessory device.

The hearing device may be a hearing aid or a hearing aid system or a hearable. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device, or a customized hearing device, etc. The hearing aid system may be a binaural hearing aid system comprising two hearing aids for right and left ears of the user respectively.

The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as physically or wirelessly connected.

Alternatively, the hearing device may be a wireless headset, and/or a true-wireless earbuds. Such hearing device may be configured for audio communication, e.g. enabling the user to listen to media, such as wirelessly streaming music or radio, and/or enabling the user to perform phone calls. The hearing device may be configured for performing hearing enhancement and/or compensation for the user. The hearing device may be configured for performing noise cancellation etc.

The hearing device may comprise an output transducer e.g. a receiver. The output transducer may be a part of a printed circuit board (PCB) of the hearing device. The output transducer may be arranged on a printed circuit board (PCB) of the hearing device. The output transducer may not be a part of the PCB of the hearing device.

The hearing device may comprise at least one input transducer, e.g. at least one microphone, generating one or more microphone output signals based on a received acoustic signal from the at least one microphone. Alternatively or additionally, the hearing device may comprise an antenna acting as another input transducer and generating an output signal based on a received audio signal from the at least one antenna. The microphone output signal may be an analog signal which is then converted to a digital signal by an analogue-to-digital (A/D) converter. Thus, the input transducer, e.g. microphone, or an A/D converter, may convert the acoustic or audio signal into a digital output signal. All the signals may be sound signals or signals comprising information about sound.

The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. The hearing device may comprise a receiver or output transducer or speaker or loudspeaker. The receiver may be connected to an output of the signal processor. The receiver may output the modified signal into the user's ear. The signal processor may be a digital sound processor (DSP). The DSP may comprise any of the following modules or a combination thereof: a beamformer, environmental classification module, and amplifier.

The hearing device signal processor may comprise elements such as an amplifier, a compressor and/or a noise reduction system etc. The signal processor may be implemented in a signal-processing chip of the hearing device. The hearing device may further have a filter function, such as compensation filter for optimizing the output signal.

The hearing device may comprise one or more antennas for radio frequency communication. The one or more antenna may be configured for operation in ISM frequency band. One of the one or more antennas may be an electric antenna. One or the one or more antennas may be a magnetic induction coil antenna. Magnetic induction, or near-field magnetic induction (NFMI), typically provides communication, including transmission of audio and data, in a range of frequencies between 2 MHz and 15 MHz. At these frequencies the electromagnetic radiation propagates through and around the human head and body without significant losses in the tissue.

The magnetic induction coil may be configured to operate at a frequency below 100 MHz, such as at below 30 MHz, such as below 15 MHz, during use. The magnetic induction coil may be configured to operate at a frequency range between 1 MHz and 100 MHz, such as between 1 MHz and 15 MHz, such as between 1 MHz and 30 MHz, such as between 5 MHz and 30 MHz, such as between 5 MHz and 15 MHz, such as between 10 MHz and 11 MHz, such as between 10.2 MHz and 11 MHz. The frequency may further include a range from 2 MHz to 30 MHz, such as from 2 MHz to 10 MHz, such as from 2 MHz to 10 MHz, such as from 5 MHz to 10 MHz, such as from 5 MHz to 7 MHz.

The electric antenna may be configured for operation at a frequency of at least 400 MHz, such as of at least 800 MHz, such as of at least 1 GHz, such as at a frequency between 1.5 GHz and 6 GHz, such as at a frequency between 1.5 GHz and 3 GHz such as at a frequency of 2.4 GHz. The antenna may be optimized for operation at a frequency of between 400 MHz and 6 GHz, such as between 400 MHz and 1 GHz, between 800 MHz and 1 GHz, between 800 MHz and 6 GHz, between 800 MHz and 3 GHz, etc. Thus, the electric antenna may be configured for operation in ISM frequency band. The electric antenna may be any antenna capable of operating at these frequencies, and the electric antenna may be a resonant antenna, such as monopole antenna, such as a dipole antenna, etc. The resonant antenna may have a length of $\lambda/4\pm10\%$ or any multiple thereof, A being the wavelength corresponding to the emitted electromagnetic field.

The hearing device may comprise one or more wireless communications unit(s) or radios. The one or more wireless communications unit(s) are configured for wireless data communication, and in this respect interconnected with the one or more antennas for emission and reception of an electromagnetic field. Each of the one or more wireless communication unit may comprise a transmitter, a receiver, a transmitter-receiver pair, such as a transceiver, and/or a radio unit. The one or more wireless communication units may be configured for communication using any protocol as known for a person skilled in the art, including Bluetooth, WLAN standards, manufacture specific protocols, such as tailored proximity antenna protocols, such as proprietary protocols, such as low-power wireless communication protocols, RF communication protocols, magnetic induction protocols, etc. The one or more wireless communication units may be configured for communication using same communication protocols, or same type of communication protocols, or the one or more wireless communication units may be configured for communication using different communication protocols.

The wireless communication unit may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

The hearing device may be a binaural hearing device. The hearing device may be a first hearing device and/or a second hearing device of a binaural hearing device.

The hearing device may be a device configured for communication with one or more other device, such as configured for communication with another hearing device or with an accessory device or with a peripheral device.

The hearing device may comprise at least two microphones placed apart from one another. A beamformed signal may be obtained from signals received by the at least two microphones by combining them to thereby improve directional listening of the hearing device.

The hearing device may be a binaural hearing device system comprising a first and second hearing device. The first hearing device may comprise a first microphone arrangement and the second hearing device may comprise a second microphone arrangement. A beamformed signal is obtained based on signals received by both the first microphone arrangement and the second microphone arrangement. Namely, the beamformed signal is obtained by combining microphone outputs from each side of the head thereby improving directional listening of the binaural hearing device system.

According to some embodiments, the hearing device, such as a hearing aid, comprises a signal processor configured to apply a head-related transfer function (HRTF) to a sound received at the hearing device. The HRTF may be configured to adapt the sound generated by the first electronic accessory device and/or an audio signal wirelessly transmitted to the hearing device in accordance with the HRTF. Optionally, the notification may be an acoustic signal and/or vibration. In the case that both the acoustic signal and vibration generate the sound. Thus, the generated sound is a representative of the notification. In order to find the accessory device, the user needs to locate the origin where the sound originates from. It could be via the user's ear directly or via the hearing device worn by the user. In the case where the user is wearing the hearing device, where the user is missing most of the spatial sensation of the sound, the signal processor of the hearing device then applies the HRTF to an incoming sound (comprising the sound generated by the accessory device) picked up by the microphones of the hearing device in order to improve localization of the incoming sound, which in turn helps the user to locate the accessory device. The HRTF improves the overall spatial cue of the sounds picked up by the microphones. By having the hearing device with a HRTF that adapts the sound representing the notification, the spatial cue and therefore sound to noise ratio (SNR) of the incoming sound are improved which then helps the user to locate the accessory device.

According to some embodiments, the hearing device, such as a hearing aid, is configured to perform an environmental classification upon sending the first request. Environmental classes may comprise an indoor class, an outdoor class, a noisy area, a quiet area, etc. Depending on the environmental class, the hearing device may adjust its operational mode (e.g. beamforming scheme) accordingly. For instance, if the hearing device detects a quiet area, an omnidirectional mode may be activated. If the environment is noisy, the hearing device may activate a directional mode. It is advantageous that the hearing device can perform classification of the environment to thereby adapt its operational mode to the near field acoustic environment.

According to some embodiments, the hearing device may be advantageously configured to operate in an omnidirectional mode upon sending the first request. According to this embodiment, the hearing device may be a hearing aid or a binaural hearing aid system. Normally, the hearing aid operates in a directional mode such that the hearing aid user hears sounds coming from the space in front of the user and from a person standing in front of and talking to the hearing aid user. If the hearing aid operates in the directional mode, operational mode may change into the omnidirectional mode, after the request is sent. The mode switch may be automatic. The hearing aid may comprise a processing unit which performs the mode switching and which is configured to change the operational mode after the request has been sent to the accessory device. By switching to the omnidirectional, the hearing aid allows the user to hear sounds from all directions and thereby find the accessory device which may be located anywhere around the hearing aid user. Once the user finds the accessory device, the operational mode may be switched back to previous mode either manually by the user or automatically.

According to some embodiments and when the hearing device is a headset, the headset may, upon sending the request, switch from an active noise cancellation mode to a hear-through mode to enable the user to hear the notification generated by the accessory device, in case the notification comprises an acoustic signal.

In some embodiments, the system may comprise a plurality of electronic accessory devices, e.g. a first accessory device, a second accessory device, a third accessory device, etc. Each of the plurality of accessory device may be wirelessly connected to the hearing device. Optionally, a plurality of requests may be defined and stored in the hearing device, and each of the plurality of requests may be associated with the corresponding electronic accessory devices of the plurality of electronic accessory devices. Each of the plurality requests may be triggered by a corresponding defined user input. In order to send a first request to the first accessory device, the user may first activate a Find-my-devices-mode by, e.g. pressing a push button or a touch sensor on the hearing device. Once the mode is activated, the user may use a first predefined voice command. Alternatively, the user may simply use a first predefined name of the first accessory device to be located selected from the plurality of electronic accessory devices and use it as a first voice command. Therefore, the first request may comprise a user's initiation of the Find-my-devices-mode followed by the first predefined voice input. Each of the plurality of electronic accessory devices connected to the hearing device may have a different name and therefore may be linked to a different predefined request, the request being in a form of a voice command used by the user.

In some embodiments, optionally, each of the accessory devices may be connected to the hearing device via different wireless connection protocols. Therefore, the first accessory device may be associated with a first request according to a first wireless connection protocol; the second accessory device may be associated with a second request according to a second wireless connection protocol. The first wireless protocol may be different from the second wireless connection protocol.

The system may comprise a second electronic accessory device, the second electronic accessory device and the hearing device being configured to provide a wireless connection with each other. The hearing device, when wirelessly connected with the second electronic accessory device, may be configured to send a second request to the second electronic accessory device, and wherein the second electronic accessory device may be configured to generate a second notification upon reception of the second request.

According to a second aspect there is provided a method for locating an electronic accessory device, a system comprising one or more electronic accessory devices and a hearing device, the one or more electronic accessory devices comprise a first electronic accessory device, and hearing device being configured to establish a wireless connection with the first electronic accessory device. The method comprising the steps of:

sending a first request from the hearing device to the first electronic accessory device; and generating a first notification by the first electronic accessory device upon the first request reception.

The method provides the user of the system with a simple way of finding the electronic accessory device which may be misplaced or out of view and reach of the user.

According to a third aspect there is provided a computer program comprising instructions which, when the program is executed by a hearing device, causes a hearing device to generate a request and transmit the request to an electronic accessory device, and to, upon the request reception, cause the electronic accessory device to generate a notification. The computer program may be installed on the electronic accessory device. The computer program may initiate and enable a wireless connection between the hearing device and the accessory device and the instructions may be executed only when the two devices are wirelessly connected. Also, the computer program may generate the notification, such as an audio notification. The computer program may be an app installed on a mobile phone, the mobile phone being the accessory device. The app may have functions similar to an alarm clock app, and it may be the alarm that turns on upon reception of the request at the mobile phone. It is an advantage to have a computer program installed and run on the accessory device as the user may be able to adjust parameters of the computer program to thereby adapt the computer program to its own needs and preferences.

The present application relates to different aspects including the system described above and in the following, and corresponding method and computer program each yielding one or more of the benefits and advantages described in connection with the first mentioned aspect, and each having one or more embodiments corresponding to the embodiments described in connection with the first mentioned aspect and/or disclosed in the appended claims. Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
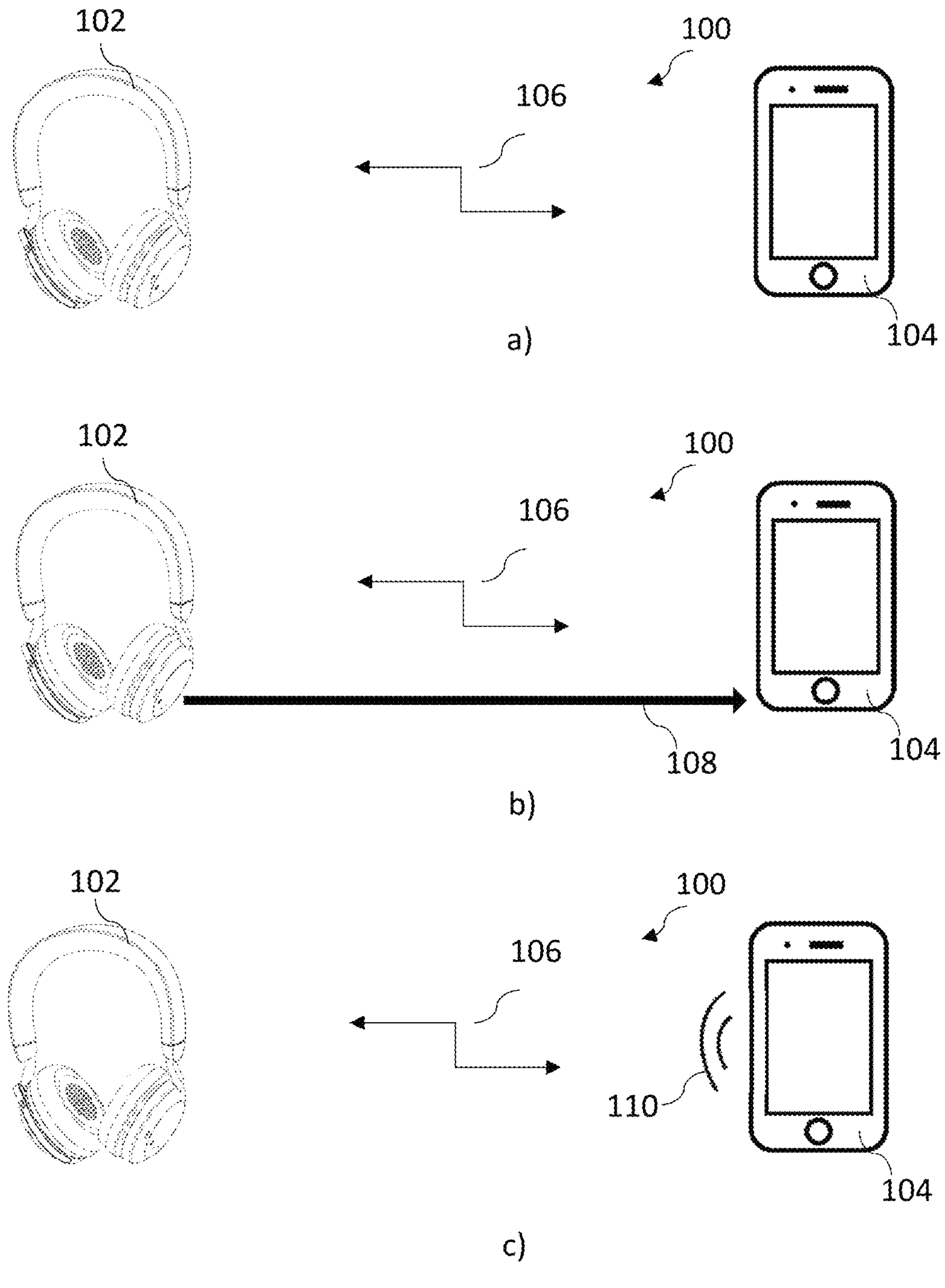
FIG. 1 shows a system for locating an electronic accessory device according to an embodiment of the present disclosure.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 shows a system 100 for locating an electronic accessory device 104 according to an embodiment of the present disclosure. The system 100 for locating the electronic accessory device 104 comprises the electronic accessory device 104 and a hearing device 102. The hearing device 102 may be an headset, true-wireless ear buds, a hearing aid or a binaural hearing aid system with an user interface. The electronic accessory device 104 may be a PDA such as a smart phone, a remote control of the hearing device 102. The user interface comprises means for receiving user input, such as, but not limited to, push button, touching sensor, microphone for receiving voice command from the user etc. The electronic accessory device 104 and hearing device 102 are configured to provide a wireless connection 106 with each other, such as, but not limited to, via Bluetooth Technology, Magnetic Induction, Wifi, Terrestrial Microwave communication or NFC etc. FIG. 1*a*) shows the system 100 with the devices 102 and 104 connected with the wireless connection 106. The hearing device 102 is typically worn by a user and the accessory device 104 is out of user's sight. When the user wants to locate the accessory device 104, the user may initiate a process of locating the accessory device 104 via the user interface. FIG. 1*b*) shows the system 100 when the hearing device 102 sends a request 108 to the electronic accessory device 104. As the devices 102 and 104 are wirelessly connected, the request 108 will reach the electronic accessory device 104, and the electronic accessory device 104 will generate a notification 110 upon reception of the request. This is shown in FIG. 1*c*). The notification comprises at least one of the following signals such as acoustic sound, vibrations, and/or optical signal e.g. LED flashing.

Figure 2:
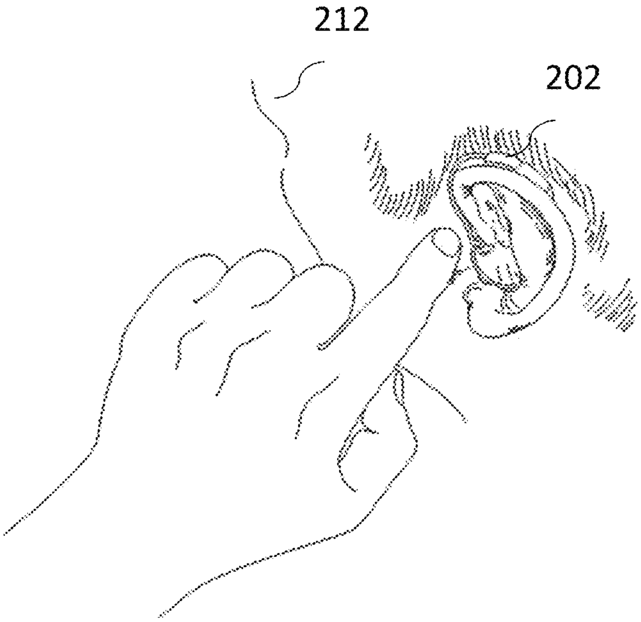
FIG. 2 shows a user initiating a process of sending a request from a hearing device.
Figure 2:
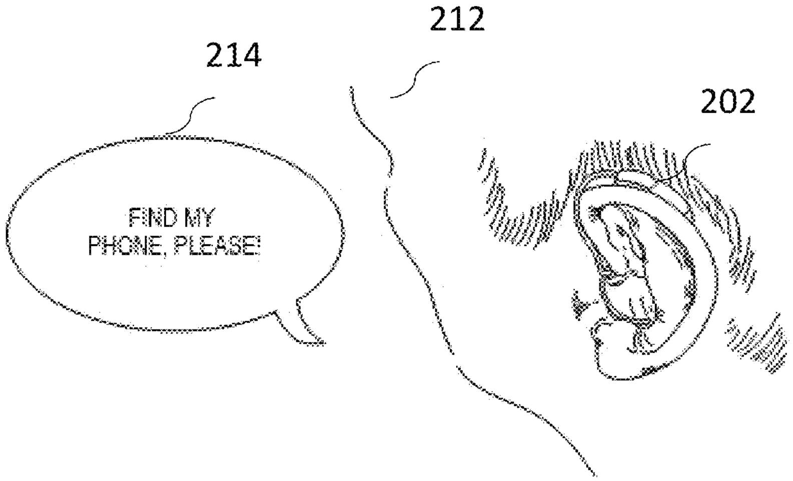

FIG. 2 shows a user 212 initiating a process of sending a request from a hearing device 202. In this embodiment, the hearing device 202 is a hearing aid 202 worn by the user 212. In FIG. 2*a*), the user 212 taps the hearing aid 202 to initiate sending the request from the hearing aid 202 to an accessory device (not shown). The hearing aid 202 is paired with the accessory device which is out of user's reach and the user 212 wants to find it. The hearing aid is configured to, upon user's initiation, send the request to the electronic accessory device. FIG. 2*b*) shows another scenario where the user 212 provides a voice command 214: "find my phone, please". The hearing aid 202 can be configured to recognize such voice command 214, receive it, and to then send the request to the accessory device. The request may comprise the user's voice command. When the accessory device receives the request, it will generate a notification. The notification may comprise an answer to the voice command 214, i.e. the accessory device may generate an audio signal. The hearing aid 202 may change its operational mode upon sending the request to adapt it to the audio signal generated by the accessory device.

Another small paragraph for a headset. Specifying switching to hear through mode after sending the request to the AD.

Figure 3A:
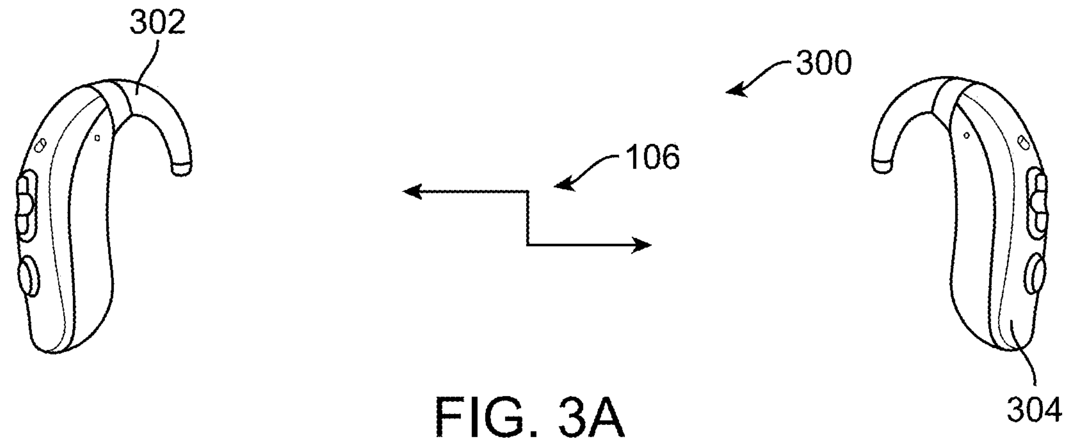
FIG. 3 shows a binaural system for locating a misplaced hearing aid according to an embodiment of the present disclosure.
Figure 3B:
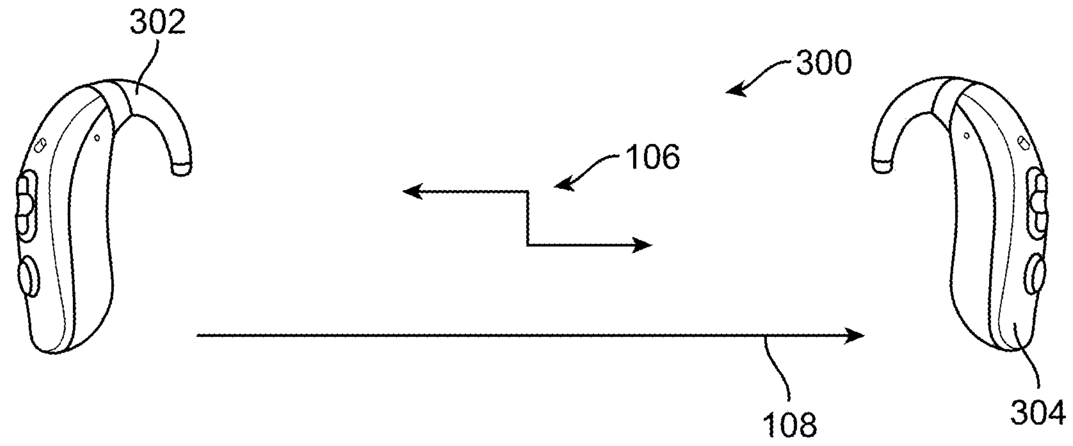
Figure 3C:
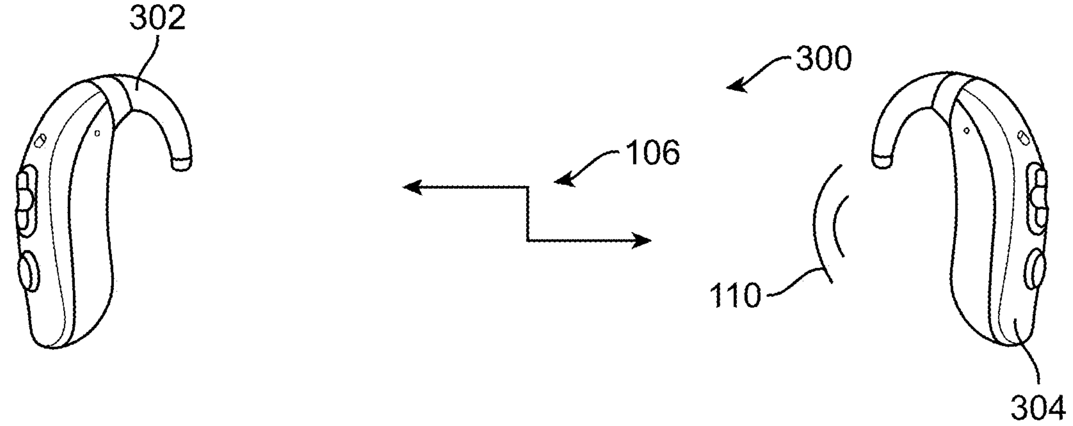

FIG. 3 shows a binaural system 300 for locating a misplaced hearing aid 304 according to an embodiment of the present disclosure. The system 300 for locating the hearing aid 304 is a binaural hearing aid system comprising two hearing aids, a left hearing aid 302 and a right, misplaced, hearing aid 304 configured to be worn on the left and right user's ear, respectively. The left and right hearing aids 302 and 304 may alternatively be a left and right true-wireless ear buds with an user interface. The user interface may comprise means for receiving user input, such as, but not limited to, push button, touching sensor, microphone for receiving voice command from the user etc. The two hearing aids 302 and 304 are configured to provide a wireless connection 106 with each other, such as, but not limited to, via Bluetooth Technology or magnetic induction. FIG. 3*a*) shows the binaural system 300 with the hearing aids 302 and 304 connected with the wireless connection 106. The left hearing aid 302 is typically worn by the user and the right hearing aid 304 is misplaced, i.e. out of user's sight. When the user wants to locate the misplaced hearing aid 304, the user may initiate a process of locating the misplaced hearing aid 304 via the user interface. FIG. 3*b*) shows the binaural system 300 when the left hearing aid 302 sends a request 108 to the misplaced hearing aid 304. As the hearing aids 302 and 304 are wirelessly connected, the request 108 will reach the misplaced hearing aid 304, and the misplaced hearing aid 304 will generate a notification 110 upon reception of the request. This is shown in FIG. 3*c*). The notification comprises at least one of the following signals such as acoustic sound, vibrations, and/or optical signal, e.g. LED flashing. Same operation can also be applied to a pair of true wireless earbud.

Figure 4A:
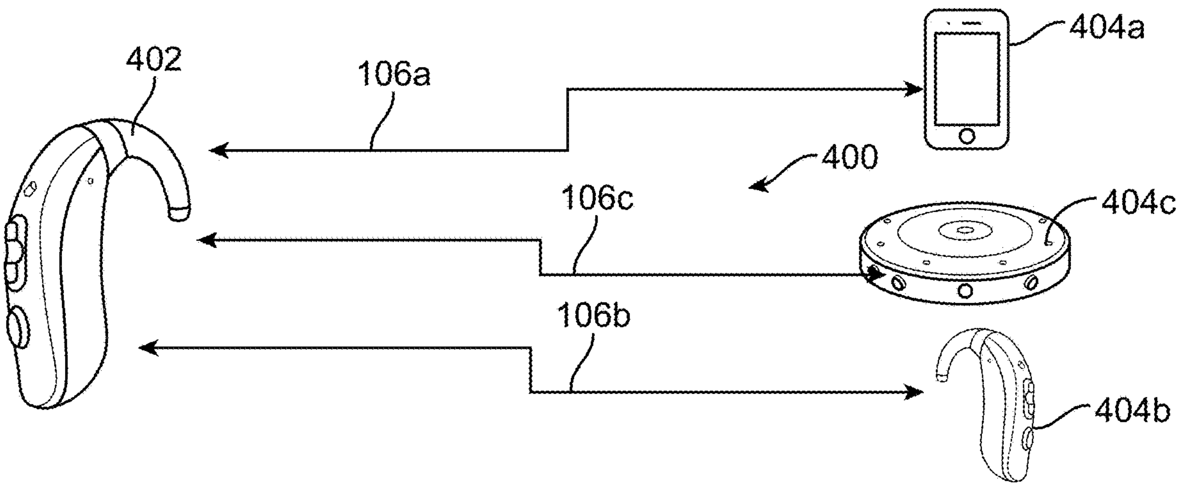
FIG. 4 shows a system for locating a misplaced electronic accessory device from a plurality of electronic accessory devices according to an embodiment of the present disclosure.
Figure 4B:
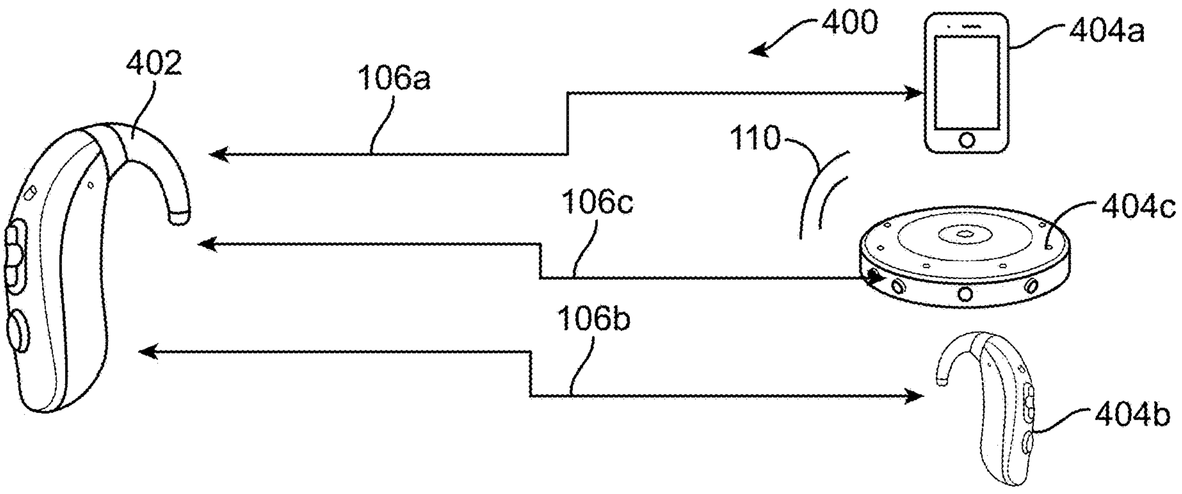

FIG. 4 shows a system 400 for locating a misplaced electronic accessory device from a plurality of electronic accessory devices according to an embodiment of the present disclosure. The system 400 for locating the misplaced device comprises a hearing device 402 and a plurality of other devices 404*a*, 404*b*, 404*c*. The other devices may comprise a smartphone 404*a*, another hearing aid 404*b* in the binaural system, an external microphone 404*c*, such as a spouse microphone or a table microphone, etc. The hearing devices 402 and 404*b* may form a binaural hearing system with an user interface. The hearing device 402 is configured to be wirelessly connected to the devices 404*a*, 404*b*, 404*c* through separate wireless connections 106*a*, 106*b*, and 106*c*, respectively. FIG. 4*a*) shows the system 400 with the hearing device 402, and another hearing device 404*b*, a smartphone 404*a*, and an external microphone 404*c* connected with a separate wireless connection for each of the devices 404*a*, 404*b*, and 404*c*. When the user wants to locate one of the devices 404*a*, 404*b*, 404*c*, the user may initiate a process for locating a misplaced device via the user interface. Typically, each device will be linked with a predefined voice command or a predefined user input. For instance, for locating the smartphone 404*a*, the predefined voice command may be "find my phone". If the user uses such voice command, a signal processor of the hearing device 402 will know that a request should be sent to the smartphone 404*a*. Alternatively, a predefined user input, such as tapping the hearing device 402 twice, for instance, may be linked with the smartphone 404*a*. For locating the hearing device 404*b*, the predefined voice command may be "find the other hearing device" or the predefined user input may be "pressing a touch button on the hearing device 402. If the user uses one (or both) of these predefined inputs, the hearing device 402 will be sending a request to the hearing device 404*b*. Similarly, for locating the external microphone 404*c*, the predefined voice command may be "find the external microphone" and if the user uses such voice command, the hearing device 402 will be sending the request to the external microphone 404*c*. FIG. 4*b*) shows an example of the system 400 when a request is sent to the misplaced external microphone 404*c*. As the hearing device 402 and the microphone 404*c* are wirelessly connected, the request will reach the misplaced microphone 404*c*, and the misplaced microphone 404*c* will generate a notification 110 upon reception of the request. The notification may comprise at least one or any combinations of the following signals such as acoustic sound, vibrations, and/or optical signal, e.g. LED flashing.

In some embodiments, the user may first activate a Find-my-devices-mode by, e.g. pressing a push button or a touch sensor on the hearing device 402. Once the mode is activated, the user may use a predefined voice command. Alternatively, the user may simply use a predefined name of a device to be located and use it as a voice command. Therefore, the request may comprise a user's initiation of the Find-my-devices-mode followed by the predefined voice input, wherein each of the devices connected to the hearing device 402 is linked to a different predefined voice input. The predefined user input can be personalized during the initialization or fitting of the hearing device. Same operation can also be applied to a pair of true wireless earbud.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100, 200, 300, 400 system for locating a misplaced electronic accessory device
102, 304, 402 hearing device
104 electronic accessory device
106, 106*a*, 106*b*, 106*c* wireless connection
108 request
110 notification
202, 302 hearing aid
212 user
214 voice command
404*a* smartphone
404*b* hearing device
404*c* external microphone

The invention claimed is:

1. A hearing device configured for locating an electronic accessory device, the hearing device comprising:
a communication unit configured to establish a wireless connection with the electronic accessory device; and
a request generator configured to generate a request;
wherein the hearing device, when wirelessly connected with the electronic accessory device, is configured to send the request to the electronic accessory device;
wherein the request from the hearing device is configured to cause the electronic accessory device to generate a notification;
wherein the notification allows the electronic accessory device to be located; and
wherein the hearing device is configured to switch an operational mode of the hearing device from a directional mode to an omnidirectional mode in association with the request to cause the electronic accessory device to generate the notification.

2. The hearing device according to claim 1, wherein the hearing device is configured to send the request to the electronic accessory device on-demand initiated by a user of the hearing device.

3. The hearing device according to claim 1, wherein the request comprises a user's voice.

4. The hearing device according to claim 1, wherein the request is configured to activate a loudspeaker of the electronic accessory device, and wherein the notification comprises an audio signal.

5. The hearing device according to claim 1, wherein the request comprises a user's input, and wherein the notification comprises a notification code, the notification code corresponding to the user's input.

6. The hearing device according to claim 1, wherein the hearing device is a hearing aid configured to be worn by a user of the hearing aid.

7. The hearing device according to claim 6, wherein the hearing aid comprises at least one input transducer, and wherein the hearing aid is configured to detect the notification via the at least one input transducer, and provide an indication to the user of the hearing aid.

8. The hearing device according to claim 1, wherein the hearing device comprises a processing unit configured to apply a head related transfer function to a sound received at the hearing device, the sound being generated by the electronic accessory device.

9. The hearing device according to claim 8, wherein the hearing device comprises a processing unit configured to apply a head related transfer function to an audio signal wirelessly received by the hearing device.

10. A hearing device configured for locating an electronic accessory device, the hearing device comprising:
a communication unit configured to establish a wireless connection with the electronic accessory device; and
a request generator configured to generate a request;
wherein the hearing device, when wirelessly connected with the electronic accessory device, is configured to send the request to the electronic accessory device;
wherein the request from the hearing device is configured to cause the electronic accessory device to generate a notification;
wherein the notification allows the electronic accessory device to be located;
wherein the hearing device is configured to perform an environmental classification to determine a type of environment in association with the request; and
wherein the notification allowing the electronic accessory device to be located is based on the type of environment.

11. A system comprising the hearing device of claim 1, and the electronic accessory device.

12. The system according to claim 11, further comprising an additional electronic accessory device.

13. The system according to claim 12, wherein each of the electronic accessory devices is configured to wirelessly connect with the hearing device; and
wherein the hearing device comprises a memory storing a plurality of defined requests, each of the defined requests associated with a corresponding one of the electronic accessory devices.

14. The system according to claim 12, wherein each of the electronic accessory devices is associated with at least one user input.

15. The system according to claim 12, wherein the additional electronic accessory device and the hearing device are configured to wirelessly connect with each other;
wherein the hearing device, when wirelessly connected with the additional electronic accessory device, is configured to send another request to the additional electronic accessory device to cause the additional electronic accessory device to generate another notification.

16. The system according to claim 12, wherein a first wireless connection protocol between the hearing device and the electronic accessory device is different from a second wireless connection protocol between the hearing device and the additional electronic accessory device.

17. A method performed by a hearing device for locating an electronic accessory device, the method comprising:
establishing a wireless connection with the electronic accessory device;
generating a request; and
sending the request from the hearing device to the electronic accessory device to cause the electronic accessory device to generate a notification;
wherein the notification allows the electronic accessory device to be located; and
wherein the method also comprises changing, by the hearing device, an operational mode of the hearing device from a directional mode to an omnidirectional mode in association with the request to cause the electronic accessory device to generate the notification.

18. A non-transitory medium storing a set of instructions which, when executed by a processing unit, will cause the method of claim 17 to be performed.

19. A method performed by an electronic accessory device, the method comprising:
- establishing a wireless connection with a hearing device;
- receiving a request from the hearing device; and
- generating a notification by the electronic accessory device upon receipt of the request;
- wherein the notification allows the electronic accessory device to be located; and
- wherein the notification is based on a type of user input entered at the hearing device to provision the request, or is based on a type of environment in which the hearing device is located.

20. A non-transitory medium storing a set of instructions which, when executed by a processing unit, will cause the method of claim 19 to be performed.

21. The method according to claim 19, wherein the type of environment indicates night time, and wherein the notification comprises a light notification.

22. The method according to claim 19, wherein the type of environment indicates a quiet environment, and wherein the notification comprises a vibrational notification.

23. The hearing device according to claim 1, wherein a context of the request generated by the hearing device will cause the electronic accessory device to generate the notification of a corresponding type.

24. The hearing device according to claim 10, wherein the type of environment associated with the request generated by the hearing device will cause the electronic accessory device to generate the notification of a corresponding type.

25. The method according to claim 17, wherein a context of the request generated by the hearing device will cause the electronic accessory device to generate the notification of a corresponding type.

26. The hearing device according to claim 1, wherein the hearing device is configured to switch the operational mode of the hearing device from the directional mode to the omnidirectional mode after the request to cause the electronic accessory device to generate the notification is sent by the hearing device to the electronic accessory device.

27. The hearing device according to claim 1, wherein the hearing device is configured to automatically switch the operational mode of the hearing device from the directional mode to the omnidirectional mode after the request to cause the electronic accessory device to generate the notification is sent by the hearing device to the electronic accessory device.

28. The hearing device according to claim 1, wherein the hearing device is configured to switch the operational mode of the hearing device from the omnidirectional mode back to the directional mode after the electronic accessory device is located by a user of the hearing device.

* * * * *